April 14, 1931.  C. R. BLOMQUIST  1,800,592
FISH NET
Filed Jan. 29, 1930  2 Sheets-Sheet 1

Inventor
C. R. Blomquist.
By Lacey & Lacey,
Attorneys

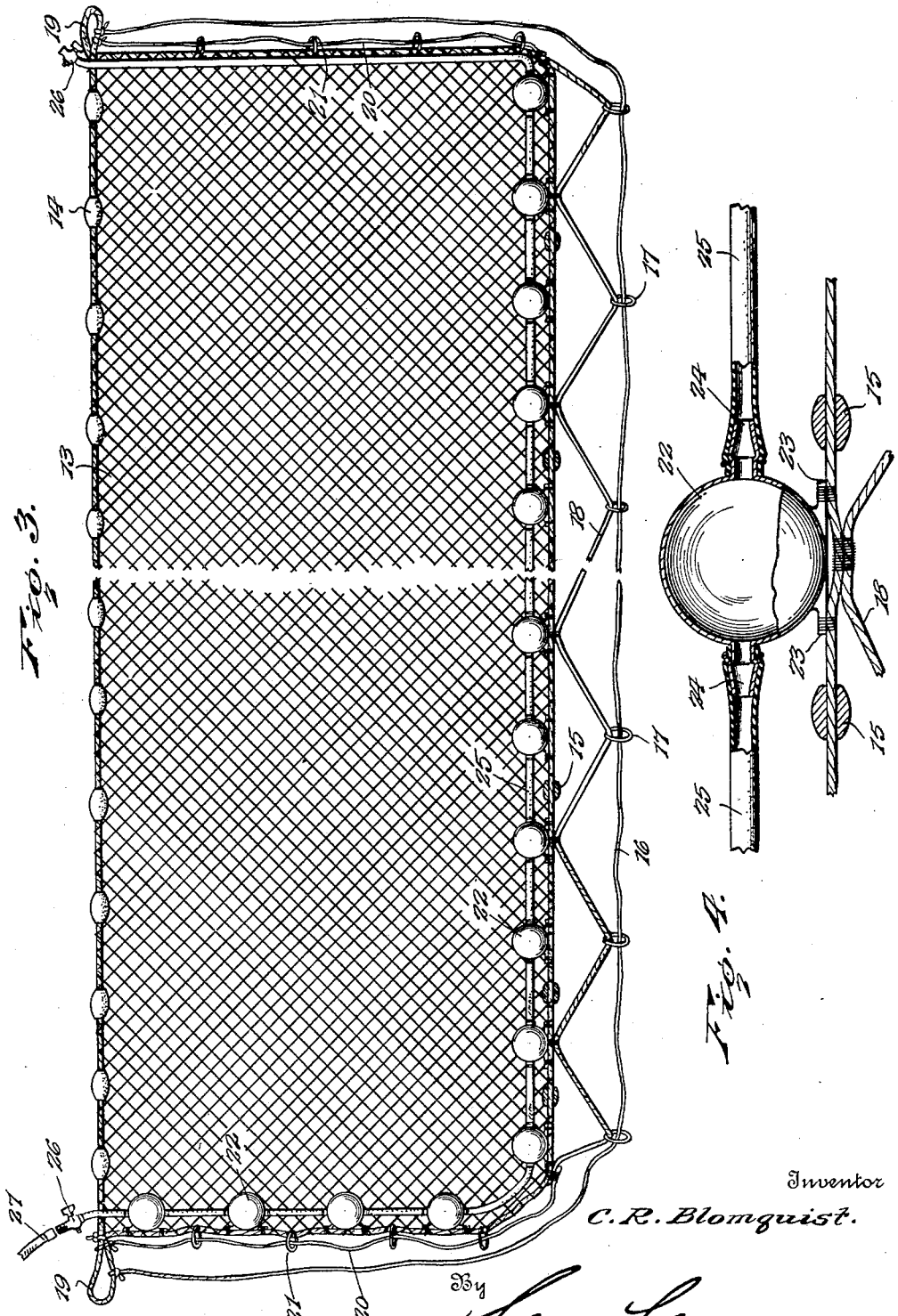

Patented Apr. 14, 1931

1,800,592

UNITED STATES PATENT OFFICE

CECIL R. BLOMQUIST, OF TACOMA, WASHINGTON

FISH NET

Application filed January 29, 1930. Serial No. 424,375.

This invention facilitates the catching of fish, particularly when a net is employed as the ensnaring means, and relates to adjunctive parts for controlling the net, both in the setting and the handling thereof.

In accordance with the invention, there is associated with the net a plurality of receptacles, the size and number thereof depending upon the specific purpose for which the net is designed, adapted to function as floats or weights, accordingly as they contain air or water.

The invention, furthermore, contemplates means, such as a windlass, mounted on the boat for winding the net thereon for convenience in handling thereof and for storing when not in use.

It is to be understood that the form of the invention herein disclosed is preferred, but in adapting the same to meet different conditions, various changes in the shape, size and arrangement of parts may be resorted to without departing from the spirit of the invention.

For a full understanding of the invention and the merits thereof, reference is to be had to the following description and the drawings hereto attached, in which corresponding and like parts are designated by the same reference characters.

In the accompanying drawings:

Figure 3 is an elevational view of the net as it appears when operatively positioned, an intermediate portion being broken away.

Figure 4 is an enlarged detail view, partly in section, of one of the receptacles and parts intimately associated therewith.

Figure 1:
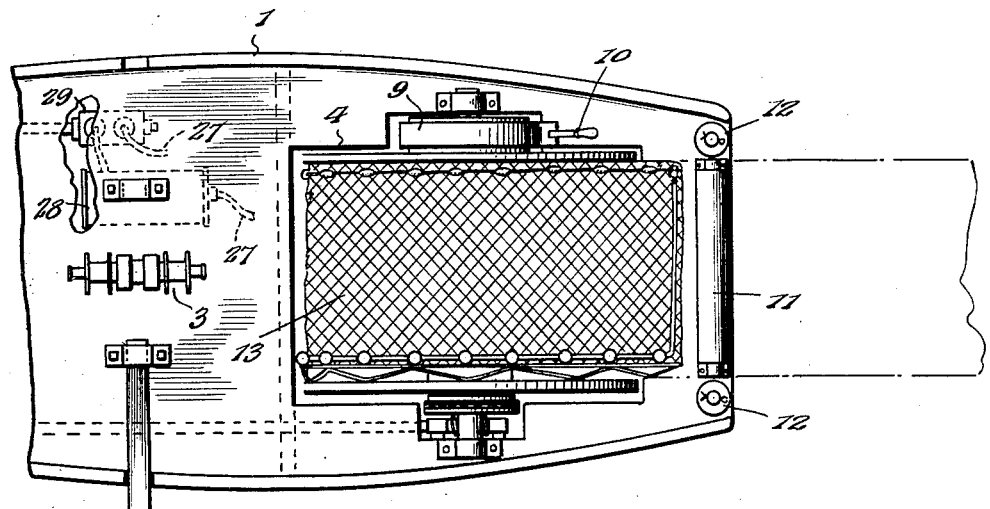
Figure 1 is a top plan view of the rear portion of a fishing boat, illustrative of an embodiment of the invention, the net being reeled upon a windlass located adjacent the stern.
Figure 2:
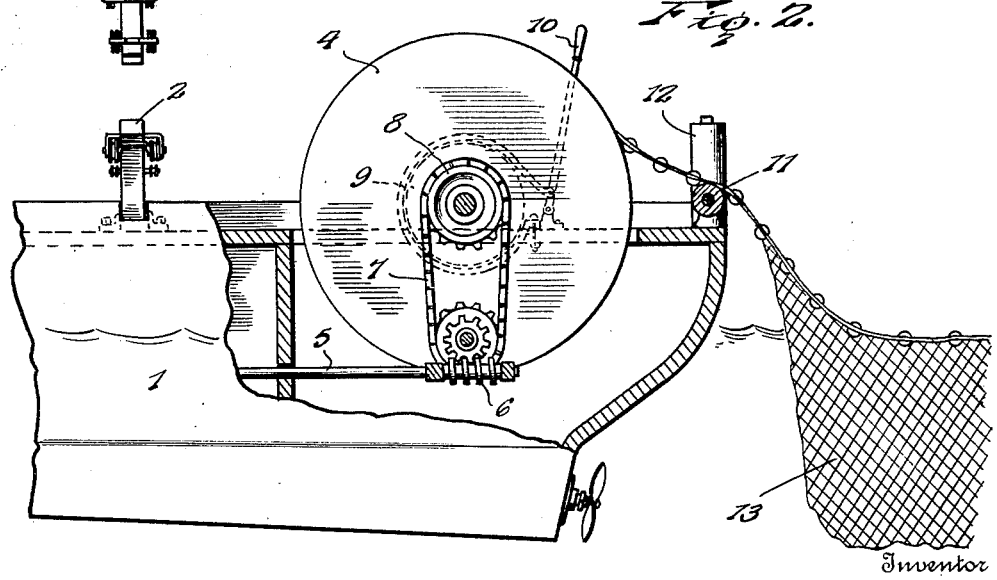
Figure 2 is a side view of the parts illustrated in Figure 1, a portion of the hull being broken away and a part of the net being shown in the water.

The numeral 1 designates a fishing boat and 2 a davit usually provided for convenience in handling of the net when hauling the same. The numeral 3 indicates a winch such as generally provided for reeling the breast and purse lines when drawing in or hauling the net. These are well known parts and equipment of fishing boats.

In accordance with the present invention, a windlass 4 is disposed adjacent the stern of the boat 1 and is connected with the motive power to be operated thereby. A drive shaft 5 coupled to the engine or other source of power (not shown) is geared to the windlass 4 by means of the gearing 6, drive chain 7 and gear wheel 8 fast to the shaft of the windlass. A suitable brake mechanism 9 is associated with the windlass to control the unwinding of the net therefrom and is adapted to be actuated by means of an operating lever 10. A guide roller 11 is disposed transversely of the stern and vertical guide rollers 12 are located at the ends thereof and coact therewith to give proper direction to the net both in the reeling and the unwinding thereof, as will be readily appreciated.

The net, designated by the numeral 13, may be of any capacity and make and is adapted to be wound upon the reel 4, as indicated most clearly in Figure 1 of the drawings. Floats 14 are provided at intervals along the top of the net 13 and weights 15 are located at intervals along the bottom of the net. The usual purse line is shown at 16 and passes through rings 17 lashed to the accustomed line 18 fastened at intervals to the bottom of the net. Opposite end portions of the purse line 16 extend along the ends of the net and are temporarily connected to loops 19 at the upper corners of the net so as to be readily accessible when it is required to purse and haul the net. The breast lines 20 are connected to the lower corner portions of the net and extend along the ends thereof and pass through guide rings 21 and may be attached in any manner to the upper corners of the net for convenience of access when required. The guide rings 21 are attached in any determine way to end portions of the net.

As heretofore stated, the vital feature of the invention resides in the provision of a plurality of receptacles 22 which are hollow and substantially formed. These receptacles may be of any shape and size and usually are of spherical outline and constructed of metal such as brass. These receptacles 22 are located at intervals along the bottom and one end of the net and are secured thereto in any substantial manner. As indicated in Figure 4 of the drawings, lugs 23 are disposed at one side of each of the receptacles and aline to receive the lashing or other fastening means resorted to for connecting the receptacles to the net. Nipples 24 project from opposite sides of the receptacles 22 and receive lengths of flexible tubing 25 provided to connect the receptacles in series so that air or water may be supplied thereto as required, either to float or weight the net. The elements 25 provide, in effect, a flexible tube which is equipped at its ends with valves 26 to which a flexible tube 27 may be coupled to permit of supplying air or water to the receptacles 22. The numeral 28 indicates a tank or reservoir for holding compressed air. A pump 29 is provided for suppling the receptacles 22 with water when it is required to weight the net to supplement the accustomed lead weights 15. The tank 28 and pump 29 may be conveniently located upon the boat and the flexible tube 27 may be connected to either accordingly as the receptacles 22 are to be filled with air or water. The net, provided with the receptacles 22, may be lashed or otherwise secured to the drum 4 preliminary to the winding of the net thereon. When the net is set for service, its top is floated by the elements 14 and its bottom is weighted by means of the leads 15. The action of the weights 15 may be supplemented by supplying the receptacles 22 with water. When pursing the net, the receptacles 22 may be filled with air, any water contained therein being expelled as the air enters. The pipe 27 from the air tank 28 is coupled to one of the valves 26 and the opposite valve 26 is opened to permit the water displaced by the air to be discharged, as will be readily comprehended. The net may be manipulated in a manner well understood, the breast and purse lines passing over guide pulleys at the outer end of the davit 2 and being connected to portions of the winch 3 which, when rotated in the usual manner, effects a winding of the lines thereon and a drawing in of the net in the usual way. For convenience, the net is wound upon the windlass 4 so as to be out of the way and in position for handling conveniently and expeditiously. During the winding and the unwinding of the net it is directed by the guide rollers 11 and 12, the latter retaining the net upon the horizontal roller 11 and said horizontal roller preventing injury to the net during the paying out or the hauling in thereof.

What is claimed is:

1. The combination with a fish net, of a hollow receptacle provided with opposed alined lugs at one side thereof, and fastening means between said lugs and net.

2. The combination with a fish net, of a plurality of hollow receptacles having opposed nipples, flexible tubes connecting the receptacles in series and coupled to the nipples, and valves at the ends of the connected series of receptacles.

3. The combination with a fish net, of a plurality of hollow receptacles along an end and the bottom thereof, the opposite end of the net being free for engagement with a windlass to permit of winding the net thereon.

In testimony whereof I affix my signature.

CECIL R. BLOMQUIST. [L. S.]